United States Patent [19]

Ibbotson et al.

[11] Patent Number: 5,535,286
[45] Date of Patent: Jul. 9, 1996

[54] ERROR DETECTION IN SEISMIC DATA

[75] Inventors: John B. Ibbotson, Southampton; John M. Knapman, Chandler's Ford; Colin L. Bird, Fair Oak; Sydney G. Chapman, Winchester; Ian Henderson, Bedford, all of United Kingdom

[73] Assignee: International Business Machines Corporation, Armonk, N.Y.

[21] Appl. No.: 266,919

[22] Filed: Jun. 27, 1994

[30] Foreign Application Priority Data

Jul. 2, 1993 [GB] United Kingdom .................. 9313682

[51] Int. Cl.⁶ .................................................. G06K 9/00
[52] U.S. Cl. ........................ 382/109; 382/199; 382/203; 382/219; 348/85
[58] Field of Search ................................ 382/109, 190, 382/191, 195, 199, 203, 206, 207, 209, 217–219, 220, 222, 273, 213; 367/14, 25, 21; 73/151, 156, 182, 784; 348/85; 356/241

[56] References Cited

U.S. PATENT DOCUMENTS

| | | | |
|---|---|---|---|
| 4,682,220 | 7/1987 | Beurskens | 358/106 |
| 4,706,205 | 11/1987 | Akai et al. | 382/297 |
| 4,896,279 | 1/1990 | Yoshida | 382/170 |
| 5,179,441 | 1/1993 | Anderson et al. | 358/88 |
| 5,206,596 | 4/1993 | Beihoff et al. | 324/536 |
| 5,226,017 | 7/1993 | Fostin | 367/25 |
| 5,274,718 | 12/1993 | Leonardi et al. | 382/56 |

OTHER PUBLICATIONS

Robust-detection of facial features by generalized symetry Daniel Reisfeld et al. Dept of Computer Science. Tel Aviv University IEEE Pattern recognition 1992, 11th Int'l. vol. 1, conf A.

*Primary Examiner*—Joseph Mancuso
*Assistant Examiner*—Bipin Shalwala
*Attorney, Agent, or Firm*—Jonathan E. Jobe, Jr.; Craig J. Yudell; Andrew J. Dillon

[57] ABSTRACT

An apparatus for detecting errors in frames of seismic data that can be presented as images, such images being expected to exhibit an inherent symmetry about an axis, the apparatus comprising: a storage device for storing a frame of seismic data which can be presented as an image; a selection device for selecting an axis within the image as the axis of symmetry; a divider for dividing the data about the axis of symmetry to create first and second sets of data; and a comparison means for comparing the sets of data according to preselected matching criteria to determine, based on the degree of matching, whether the extent of mismatch in the frame of data is within a predetermined tolerance.

16 Claims, 5 Drawing Sheets

CREATION OF EDGE LIST

SUBTRACTION STEP

RE-ORDERING STEP

ERROR DETECTION IN SEISMIC DATA

BACKGROUND OF THE INVENTION

1. Technical Field

The present invention relates in general to the detection of errors in seismic data and in particular to apparatus for detecting errors in frames of seismic data that can be presented as images.

2. Description of the Related Art

Due to the techniques used for collecting seismic data, an image produced to represent that data will typically be expected to exhibit an inherent symmetry about an axis. However seismic survey data is subject to various errors from many causes; the most frequent cause of errors are background noise and misplaced equipment. Analysis of the seismic data is typically a very long process with the data passing through many stages of computational processing. Hence it is desirable to identify errors in frames of data as early as possible to avoid wasting valuable time processing bad data. A reliable technique for detecting errors could save much re-work.

Typically a company involved in obtaining and analyzing seismic data will have to transport a great deal of hardware to the survey location, will carry out a large number of seismic tests, and then will return to the laboratory to analyze the data. Seismic tests usually involve positioning cables in lines on the surface of the land (or towing cables behind a ship on the surface of water), each cable having a number of sensors attached to it along its length. A shock wave is then generated, eg. by firing a shot, at a location on the surface symmetrically disposed with respect to the cables, and the shock waves are detected along these cables of sensors. Given this type of arrangement, it is apparent that viewing the collections of signals as an image and checking for symmetry is a good way of detecting errors.

However, up until now, this has been done by geophysicists checking by eye. Obviously this is very time consuming, labor intensive, and prone to errors, and so it would be highly desirable to reduce the time that a geophysicist must spend inspecting the data. The seismic industry has applied theories of geophysics in an attempt to solve the problem of error detection, but has been unable to solve the problem purely within the domain of geophysics.

SUMMARY OF THE INVENTION

It is hence an object of the present invention to provide an improved technique for detecting errors in frames of seismic data, which requires much less human activity.

It is another object of the present invention to provide a technique for detecting errors, which can be carried out at the survey site so that, if necessary, data can be re-acquired before the testing equipment is removed from the site.

According to the present invention, the foregoing and other objects are attained by an apparatus for detecting errors in frames of seismic data that can be presented as images, such images being expected to exhibit an inherent symmetry about an axis, the apparatus comprising: a storage device for storing a frame of seismic data which can be presented as an image; a selection device for selecting an axis within the image as the axis of symmetry; a divider for dividing the data about the axis of symmetry to create first and second sets of data; and a comparison means for comparing the sets of data according to preselected matching criteria to determine, based on the degree of matching, whether the extent of mismatch in the frame of data is within a predetermined tolerance.

Typically the comparison means will comprise a matching device for comparing the sets of data to determine the degree of matching between such sets, and decision logic, responsive to output from the matching device, to determine whether the extent of mismatch is within the predetermined tolerance.

In preferred embodiments the comparison means will also comprise an edge detector for determining the data points representing discontinuities in the image, and to create an edge list of such data points. Such edge lists will then be used as the basis of comparison by the matching device. The advantage of using an edge list as the input to the matching device is that it will typically present many less points for comparison than the original data would present (eg 2058 edges in a 128×128 image (16384 bytes)). Hence the speed of the comparison process is improved.

The divider can be arranged to operate on the whole frame of seismic data prior to passing the first and second sets of data separately through the edge detector. In this arrangement the edge lists created by the edge detector will be received by the matching device for comparison. However, in preferred embodiments, the edge detector is arranged to operate on the whole frame of seismic data, and then the edge list is operated on by the divider so as to create two edge lists as the first and second sets of data for comparison by the matching device. This latter approach reduces computing overhead since only one set of data has to be passed through the edge detector rather than two; the edge detection process has a significant setup overhead.

The divider may just divide the data about the axis of symmetry, or additionally may include a mirroring means for re-ordering the data in the first set of data so that it can be represented by an image which would be the mirror image of the image previously representing that set. In preferred embodiments the divider includes a mirroring means and the comparison means is then arranged to compare the second set of data with the re-ordered first set of data. By employing a mirroring means in the divider, a much simpler form of comparison means can be used than would otherwise be necessary.

Typically the mirroring means re-orders the first set of data created by the divider by employing a buffer in which to store data from that set of data constituting a row of an image, the contents in the buffer then being read out in reverse order and stored as the re-ordered first set of data.

The selection device can be implemented by means of an amplitude peak detector which selects the axis of symmetry as the position in the data having the highest detected intensity. However, in preferred embodiments, the selection device uses information contained in the seismic data, giving the positioning of the shot for that frame of data, to select an axis as the axis of symmetry.

The edge detector can use any one of a number of edge detection techniques. However, in preferred embodiments, the edge detector employs a Canny edge detection algorithm in order to identify the data points representing edges. The Canny algorithm is a known edge detection algorithm and so will not be described in detail herein; the article by J. F. Canny entitled "A Computational Approach to Edge Detection", IEEE Trans. Pattern Analysis & Machine Intelligence, 6:679–698 (1986), describes the algorithm in detail.

In preferred embodiments, the matching device uses a stereo matching algorithm. A particularly preferable stereo matching algorithm is the PMF algorithm, which has shown in the present circumstances to be more efficient and robust than alternative techniques.

Typically the seismic data represents geological structure created from seismic disturbance measurements taken at fixed points from a source of disturbance.

Viewed from a second aspect the present invention provides a method of detecting errors in frames of seismic data that can be presented as images, such images being expected to exhibit an inherent symmetry about an axis, the method comprising the steps of: (a) storing a frame of seismic data that can be presented as an image in a storage device; (b) selecting an axis within the image as the axis of symmetry; (c) employing a divider to divide the image about the axis of symmetry to create first and second sets of data; and (d) comparing, in a comparison means, the sets of data according to preselected matching criteria to determine, based on the degree of matching, whether the extent of mismatch in the frame of data is within a predetermined tolerance.

The present invention solves the error detection problem by utilizing a number of techniques developed for image processing to create an apparatus which can quickly and reliably identify errors with the minimum of user interaction. The apparatus will 'flag' frames of seismic data which show deviations from symmetry, after allowing for certain natural variations, so that a user, typically a geophysicist, can decide whether such frames should be discarded or retained for further processing.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
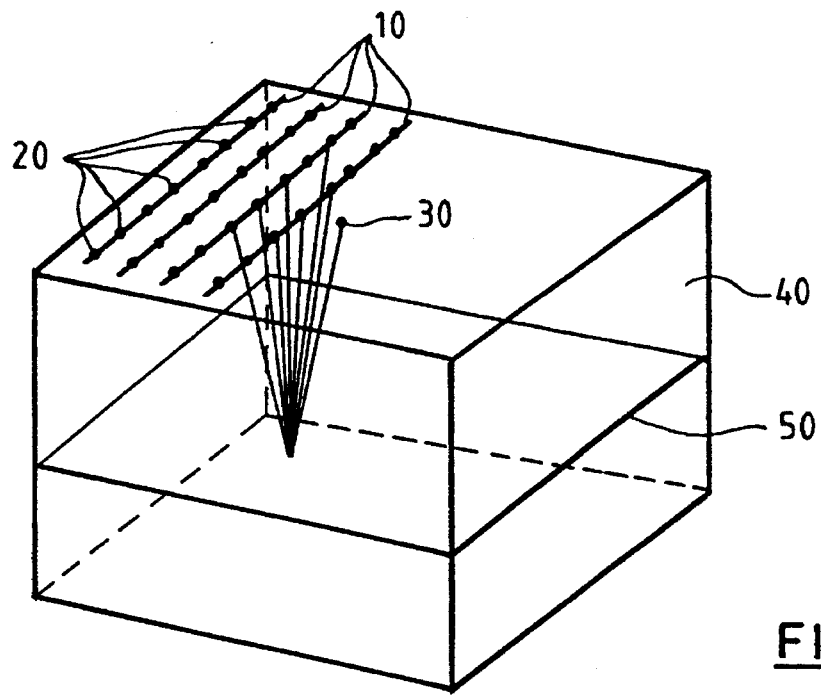
FIG. 1 shows a typical arrangement used to gather seismic data.

FIG. 1 illustrates a typical technique used to obtain seismic data representing the geological structure of an area of rock below the earth's surface. Lines of cables 10 are set out on the earth's surface, each cable incorporating a number of geophone sensors 20. Then a source of sound 30 is placed within the vicinity of the cables and is activated to emit a shot, causing shock waves to pass down into the ground. These waves reflect off the various layers of rock 50 in the ground 40 and the reflected waves are detected by the array of geophone sensors 20. Next the source 30 is moved to a different position and again a shot is fired. The process is repeated a number of times so as to create a series of shots at different locations, and to yield a large number of frames of seismic data.

Figure 6:
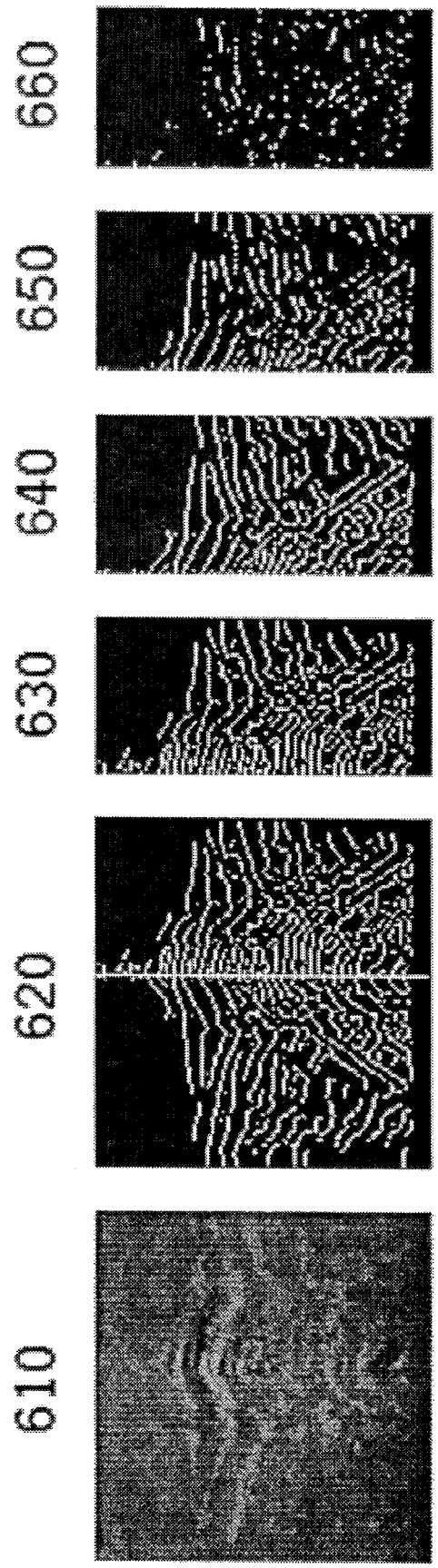
FIG. 6 shows a frame of raw seismic data obtained from a cable of sensors, and various other images representing various stages during the error detection process.

This data is then returned to the laboratory for processing. For each cable, the data received by the various geophone sensors on that cable for a particular shot can be used to create an image 610 such as that shown in FIG. 6. In image 610, the x-axis corresponds to geophone position (i.e. trace) and the y-axis corresponds to time. FIG. 6 shows a frame of raw seismic data obtained from a cable of sensors, and various other images representing various stages during the error detection process; this figure is purely illustrative, and in the preferred embodiment of the present invention there is no need to represent the data graphically. Although FIG. 6 illustrates a rather idealized sample, there will generally be an axis of symmetry similar to that shown.

In computer vision literature, there are various known techniques that attempt symmetry detection, see for example the article entitled "Using a Mixed Wave/Diffusion Process to Elicit the Symmetry Set" by Scott, Turner and Zissermann, Proceedings of the Fourth Alvey Vision Conference, University of Manchester, 31 Aug.–2 Sep. 1988, page 221, and the article entitled "Recognize the Similarity Between Shapes under Affine Transformation" by Hong and Tan, IEEE Second International Conference on Computer Vision, 5–8 Dec. 1988, page 489. Neither of these techniques are particularly robust or efficient. Applications in the computer vision field have generally been to simplified, artificial images. Seismic data presents a problem which is quite different in character since it generally has significantly greater information content, but does have the simplification that the whole image exhibits symmetry about a fairly obvious axis that is usually vertical (since the rock interfaces tend to be approximately horizontal). Most known symmetry detectors employ complex techniques which concentrate on the problem of finding the axis of symmetry; clearly these techniques are not required for typical frames of seismic data.

In the preferred embodiment of the present invention, the problem of finding the axis of symmetry can be solved either by using a straightforward peak detector or by using information about the positioning of the shot with relation to the geophones. This will be discussed in more detail later with reference to FIG. 3. With the axis identified, the matching problem then becomes one of comparing the set of data to the left of the axis with the set of data to the right of the axis.

Figure 2:
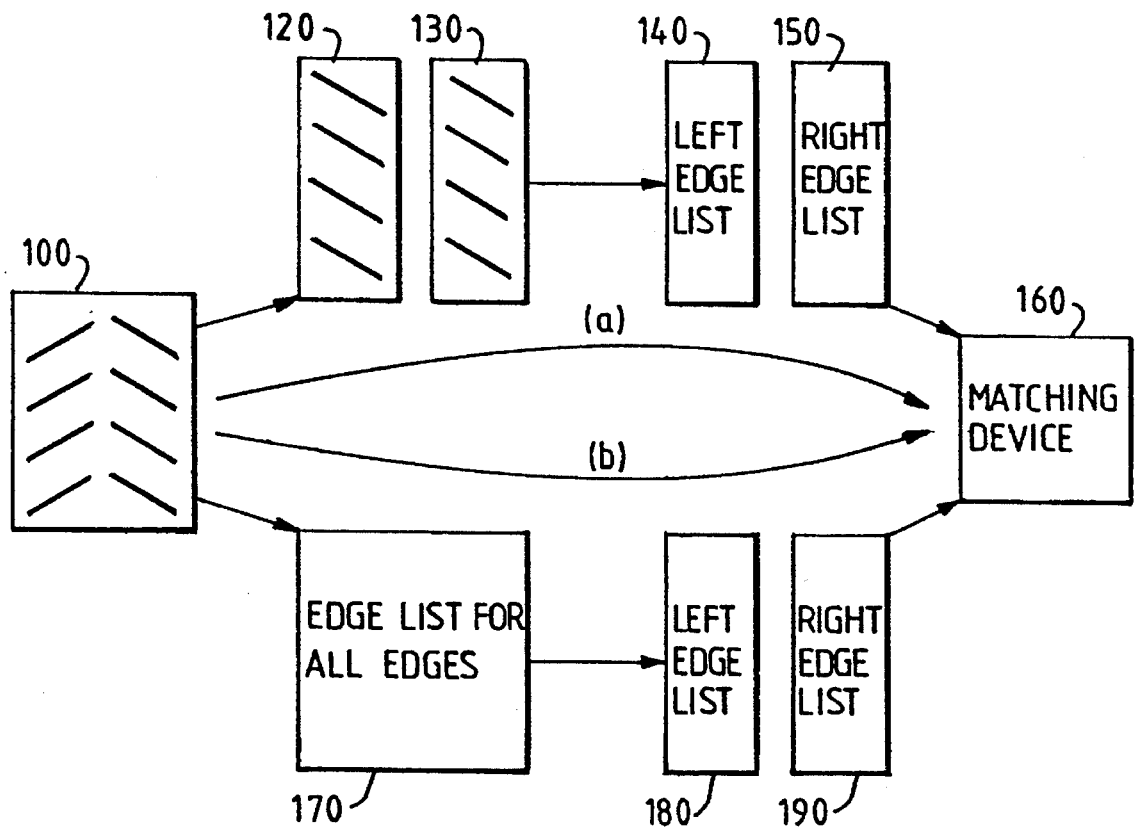
FIG. 2 is a diagram illustrating two different techniques for embodying the present invention.

FIG. 2 is a block diagram illustrating at a high level two different techniques of implementing the invention to detect errors in a frame of seismic data. In both techniques the first step is to identify the axis of symmetry in the frame of seismic data represented by image 100.

Then if technique (a) is chosen, the seismic data is divided into two sets of data; the first set contains data that can be represented by the left half of the image 100, and the second set contains data which can be represented by the right half of image 100. The data in the first set is then reordered so that it would be represented by an image which is the mirror image of the image previously representing that set. The left set can then be represented by image 120 whilst the second set can be represented by image 130.

These two sets of data are then passed separately through an edge detector, typically employing 'Canny' edge detection, to yield two edge lists 140 and 150. The edges in this context can be defined as discontinuities in intensity which are associated with boundaries between areas in the original data or image representing that data.

Finally, the two edge lists are passed to a matching device 160 for comparison with each other. The matching device must then apply some kind of symmetry matching method to the edge lists. Since one of the sets of data has been re-ordered (or 'mirrored'), the comparison that needs to be made can be seen to be similar to the matching of a pair of images in stereoscopic vision, where two cameras (or two eyes) see two slightly different views. There are some robust algorithms available for stereo matching; the PMF algorithm produced by Pollard et al has shown itself to be particularly suitable. Details of this algorithm can be found in the article by S. B. Pollard, J. E. W. Mayhew, and J. P. Frisby entitled "PMF: A Stereo Correspondence Algorithm using a Disparity Gradient Constraint", Perception, 14:449–470 (1985).

If technique (b) is chosen, the edge detection stage is carried out directly after the identification of the axis of symmetry, and before the frame of seismic data is divided. This yields an edge list 170 containing all the discontinuities located in the whole frame of seismic data. This edge list is then split using details of the axis of symmetry to produce two edge lists. The first edge list is then reordered using a process described later to yield a modified first edge list which, if represented graphically, would be a 'mirror image' of the representation of the unmodified first edge list. These two edge lists 180 and 190 are then passed to the matching device 160 for comparison.

Technique (b) is preferred over technique (a) since it reduces computing overhead by requiring only one set of data to be passed through the edge detection stage.

Figure 3:
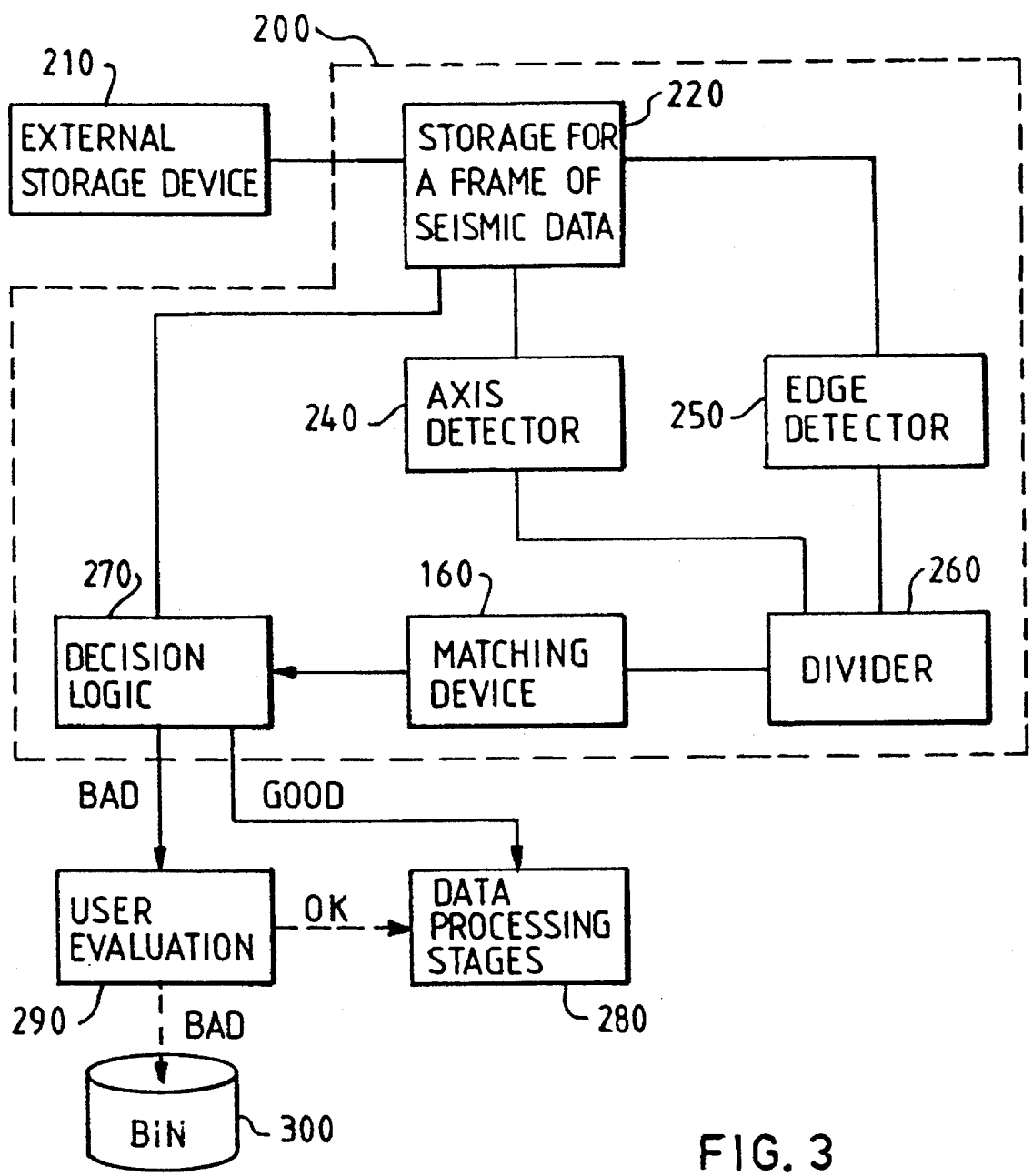
FIG. 3 is a block diagram showing the elements of the apparatus according to the preferred embodiment of the present invention.

The apparatus of the preferred embodiment of the present invention will now be described with reference to the block diagram shown in FIG. 3.

The results from a particular set of seismic tests are stored in an external storage device 210 such as a magnetic tape device. If there is a general understanding of the rock distribution in the survey area from which these results were obtained then some pre-processing correction can be made to the raw data. Since sound travels faster through matter as the matter's density increases, knowledge of the rock distribution can be used to establish an understanding of the velocity distribution across the survey area, and this can be used to introduce a correction factor into the raw data stored in storage device 210. Once this correction has been made, images representing such seismic data will be expected to exhibit an inherent symmetry about an axis. This correction technique is one that is generally applied to such seismic data and so will not be described in any further detail herein.

Once any pre-processing corrections have been made, then the apparatus 200 is activated to read one frame of seismic data from the external storage device 210 into internal storage 220. This data will also include information about the width and depth of the data, and about the positioning of the shot with respect to the geophone sensors.

The axis detector 240 then accesses the seismic data in order to select an axis as the axis of symmetry. In one embodiment the axis detector will employ a straightforward peak detection technique to determine the position in the data which has the highest intensity; this position is then used as the x coordinate for a vertical axis of symmetry.

However, in the preferred embodiment, the axis detector operates by locating the information in the data giving the positioning of the shot for that frame of data, and then uses that location as the x-coordinate to create a vertical axis of symmetry.

Next, the frame of seismic data is passed to the edge detector 250, wherein a Canny edge detection routine is applied to the data to identify the data points representing discontinuities in the data (graphically, these are the lines of maximum gradient or most rapidly changing intensity). These data points are stored as an edge list 170, which is then passed to the divider 260; the divider also receives details of the axis of symmetry from the axis detector 240.

The divider 260 divides the edge list into two separate lists with data points to one side of the axis of symmetry being stored in the first edge list and data to the other side of the axis being stored in the second edge list. Once this has been done, a mirroring means within the divider 260 is then activated to reorder the first list. The reordering is such that the reordered first edge list can be represented by an image which is the reflection (or 'mirror') of the image which would represent the unaltered first edge list. The technique used to make this separation and reordering will be described in more detail later with reference to FIG. 4.

The second edge list 190 and the reordered first edge list 180 are then passed to the matching device 160, wherein the PMF stereo matching algorithm is applied to the edge lists. This yields statistics about the proportion of edge points in one edge list that are matched or unmatched to edge points in the other edge list. In the preferred embodiment, the matching algorithm also yields values for the average disparity and the average absolute disparity; for each pair of matched points, the disparity is the displacement between the point in one edge list and its mirror point projected onto it from the other edge list.

Then in the preferred embodiment, the axis detector alters the x-coordinate of the axis of symmetry by one unit to the left (eg by the distance between two adjacent geophone sensors). The divider and matching device then repeat the above described procedure using the new axis of symmetry to yield a new set of statistics. The whole procedure is then repeated once more but with the axis of symmetry shifted by one unit to the right of the original axis of symmetry.

Having done this the matching device will have created three average absolute disparity values, one for each axis of symmetry. If 'A' was the original x-coordinate of the axis of symmetry and 'd' is the disparity value then the matching device will have produced the following information:

| $AXIS_{A-1}$ | $AXIS_A$ | $AXIS_{A+1}$ |
|---|---|---|
| $d_2$ | $d_1$ | $d_3$ |

If $d_1$ is numerically less than $d_2$ and $d_3$, $AXIS_A$ is the axis with the local minimum disparity value and the statistics generated by the matching device 160 for $AXIS_A$ are then passed on to decision logic 270. If however $d_2$ or $d_3$ have values less than $d_1$, then another iteration of the process is carried out with a further axis of symmetry chosen one unit to the left or right of the axis with the lowest disparity value, eg if $d_2$ has a disparity value less than $d_1$ and $d_3$ then another iteration is carried out with the axis of symmetry having an x-coordinate of 'A-2'. If this yields a disparity value greater than $d_2$ then $d_2$ is the local minimum value and the statistics generated by the output from the matching device 160 when the axis of symmetry had an x-coordinate of A-1 are passed to the decision logic 270.

Once the axis of symmetry giving rise to the local minimum disparity value has been identified, the decision logic 270 will determine whether the statistics (eg disparity value, percentage of edges matched, etc) output by the matching device are within thresholds preset by the user. If they are, then the frame of data stored in internal storage 220 can be passed directly to the data processing stages 280 since the indication is that the frame of data is reasonably free from errors and hence suitable for processing. If however the statistics are greater than the threshold values, then the frame of data is referred for user evaluation 290 since the indication is that it includes an unacceptable proportion of errors. The user will typically be a skilled geophysicist and will view an image representing the frame of data to see how 'good' or 'bad' it looks. If the user agrees that the data is 'bad' then he can discard that frame of data. If on the other hand he decides that the data looks acceptable he can pass the frame of data on to the data processing stages 280.

Ideal threshold values for the statistics are typically set by the user during an initial tuning phase. In this initial tuning phase the user will view a number of frames of seismic data using the standard subjective prior art approach and decide whether each frame is 'good' or 'bad'. These same frames of data will then be passed one by one through the apparatus of the preferred embodiment to see if the decision logic 270 refers any of them for user evaluation. Ideally only the ones considered by the user to be bad should be referred to him, but typically the threshold values will have to be manipulated until some compromise is struck (eg all of the bad frames are passed for user evaluation plus a small proportion of the good frames).

The decision logic can be adapted to take account of a number of features when making its decision as to the quality of the frames of data. It has been found that the disparity values created by the PMF algorithm are good statistics to use as part of this decision process. If the average absolute disparity fails to reach a minimum in the region of the expected axis of symmetry then it is likely that an error exists; this fact can be used by the decision logic 270. In addition, for good data, the minimum disparity value and the depth of the average absolute disparity curve should fall below chosen threshold values. Further, the disparity curve should not exhibit ancillary minima. Given this information the decision logic has shown to perform well.

By using the above described apparatus, many images can be inspected without manual intervention. If the thresholds have been chosen correctly, very few images will be referred for manual inspection. The user can decide the optimal balance for the threshold values in order to minimize missed errors while maximizing throughput.

The above technique in which vertical axes are chosen as candidate axes of symmetry seems to work well when the seismic data represents reflections off rock interfaces lying roughly horizontal. If however the rock interfaces were at a significant angle to the horizontal then frames representing such interfaces may well not give good matching and would be referred to the user. The user would then notice that the data referred to him was in fact 'good' data but that the axis of symmetry was slightly skewed from the vertical, and would hence pass the data on for subsequent data processing rather than discarding it.

Alternatively some form of skew correction circuitry could be developed to apply a correction at an appropriate stage in the process.

Figure 4:
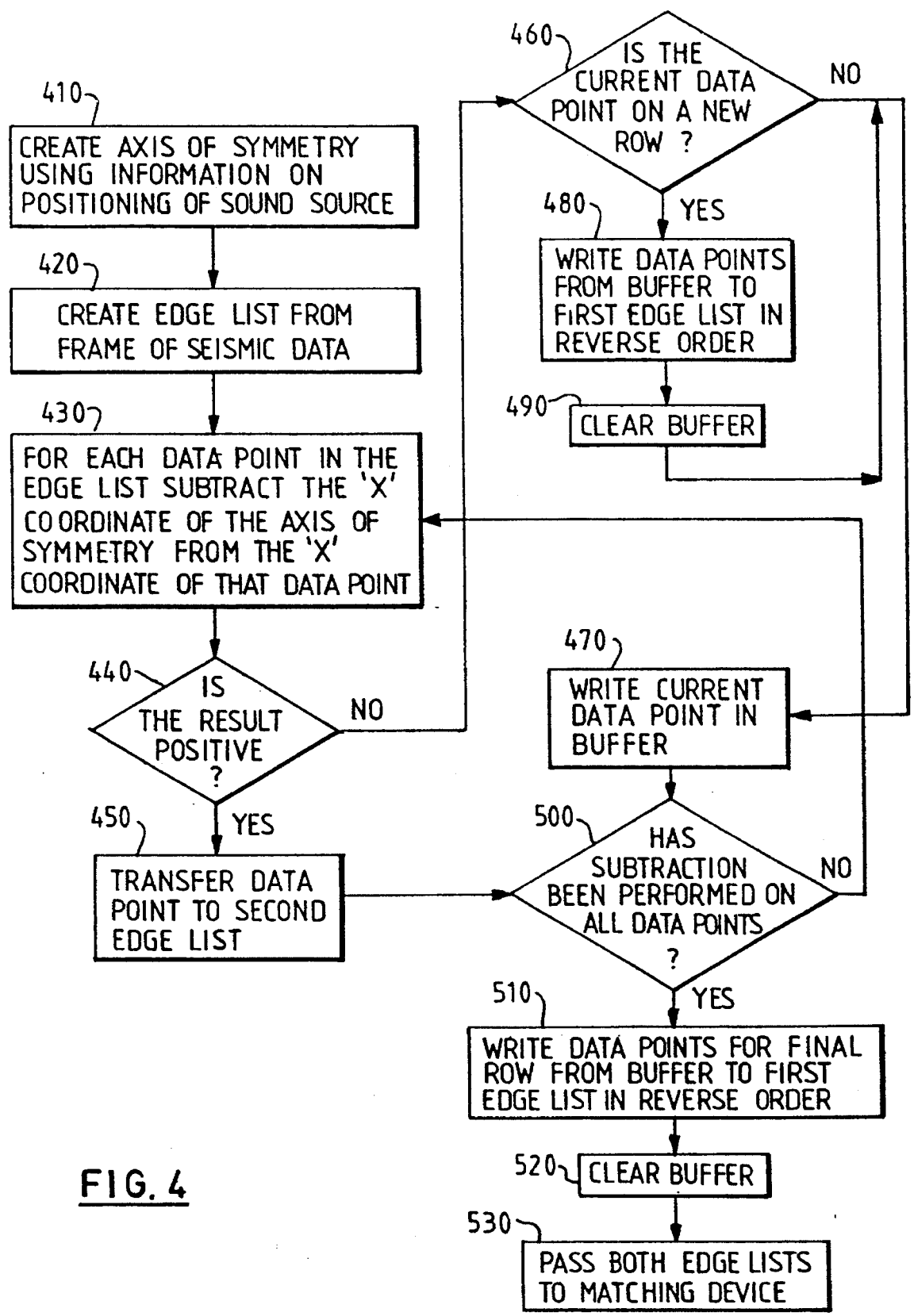
FIG. 4 is a flow diagram illustrating the process steps involved in dividing and re-ordering the edge list.

The process of dividing and reordering the edge list will now be described in more detail with reference to the flow diagram shown in FIG. 4. At step 410 an axis of symmetry is created using information contained in the frame of seismic data about the positioning of the sound source during that shot; this process is carried out by the axis detector 240 described earlier with reference to FIG. 3.

At step 420 an edge list is created from the frame of seismic data by performing Canny edge detection on that frame. The output of the Canny edge detection is an edge list listing all of the data points at which discontinuities occur.

Then at step 430 the first data point is accessed from the list and its x-coordinate value is compared with the x-coordinate of the axis of symmetry as determined at step 410. In the preferred embodiment, the comparison involves subtracting the x-coordinate of the axis of symmetry from the x-coordinate of the data point. If the result of the subtraction is positive (step 440) the data point is written directly to the second edge list (step 450). The positive value indicates that the edge point lies to the right of the axis of symmetry, and the value resulting from the subtraction gives the data point's position as adjusted to reflect its offset from the axis of symmetry.

If however the result is negative, the process proceeds to step 460 where it is determined whether the current data point is on a different row to the previous data point processed. If it is not, then the current data point is written to a temporary buffer (step 470). If however the current data point is on a new row, then the contents already in the temporary buffer are read out in reverse order and stored in the first edge list (step 480). The buffer is then cleared (step 490) and the current data point is then written to the buffer at step 470. This ensures that only the contents of one row are stored in the buffer at any one time.

The reason for writing such data points (for which the result of the subtraction is negative) to a buffer rather than directly into the first edge list is as follows. The negative value indicates that the data point lies to the left of the axis of symmetry as viewed in FIG. 6. It is preferable to perform a reordering (or "mirroring") operation on all data points to the left of the axis of symmetry in order to reduce the complexity of later comparison of the left-side edge list with the right-side edge-list. However, for each left-side edge point, this involves modifying the edge orientation as well as adjusting the position with respect to the axis. Simple "mirroring" by itself is insufficient, as the comparison process relies to some extent on the ordering of the edge-list. Accordingly, for the left-side edges, the edge points must be re-ordered within each row of the data. To do this it is necessary to collect all of the left-side edge points for any given row together in a buffer and then to perform the reordering.

At step 500 it is determined whether all of the data points in the edge list have been compared with the axis of symmetry. If this is not the case then the process returns to step 430 and a further subtraction step is performed on one of the remaining edge points. If all of the edge points have been compared, and so have been written either to the second edge list, first edge list, or the temporary buffer, then the process proceeds to step 510. At this step the data points remaining in the buffer (corresponding to the final row) are read out of the buffer in reverse order and stored in the first edge list. The process has then achieved the necessary reordering discussed above. Finally the buffer is cleared (step 520) and both edge lists are passed to the matching device 160 (step 530).

Figure 5:
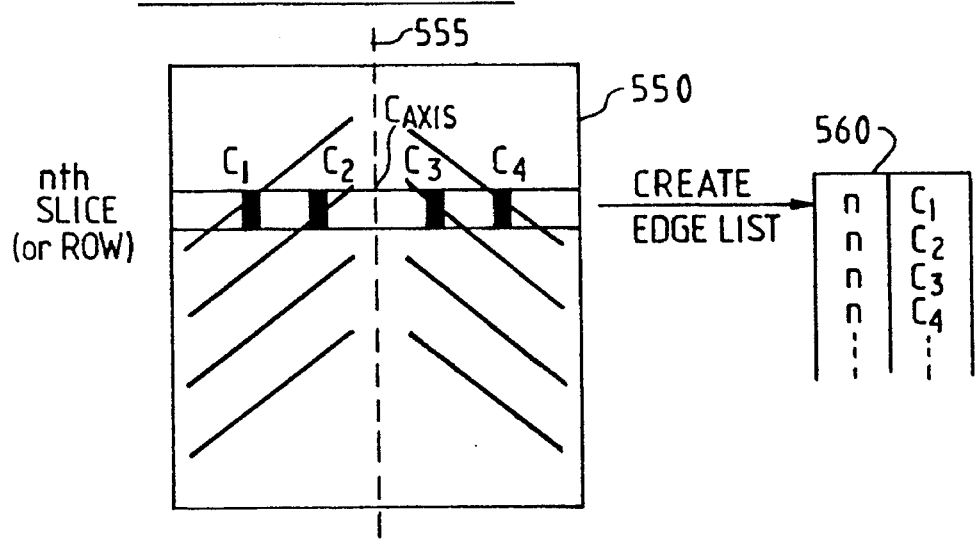
FIG. 5 is a diagram illustrating the re-ordering process carried out by the divider.
Figure 5:
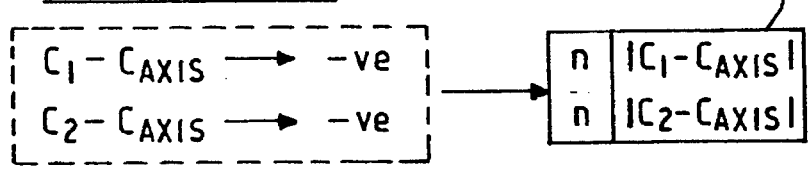
Figure 5:
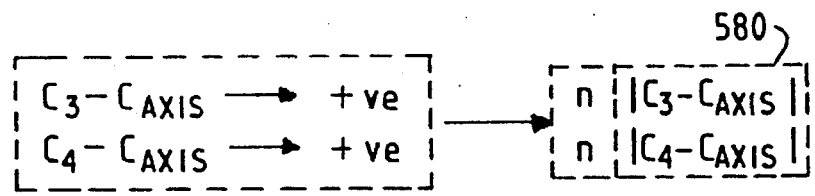
Figure 5:
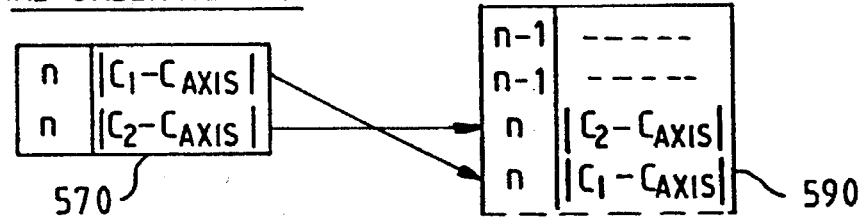

FIG. 5 is a diagram illustrating this re-ordering process. The frame of seismic data is represented by image 550, which shows the nth time slice (or row) in detail. A portion of the edge list for the nth row is represented by chart 560. Here we can see that four edge points C1, C2, C3, C4 have been identified by the edge detector for row n.

The subtraction step as illustrated in FIG. 5 shows that subtraction of the x-coordinate of the axis of symmetry from the x-coordinate of the edge points of row n yields negative values for C1 and C2 and positive values for C3 and C4. The positive values are written directly into the second (or right-side) edge list, a portion of which is shown by chart 580, whilst the modulus of the negative values are written into the buffer 570.

The re-ordering step involves, upon reaching the first left-side edge point in row n+1, reading the values for row n out of the buffer 570 in reverse order and storing them in the first (or left-side) edge list, a portion of which is shown by chart 590. In this way the first edge list comes to be filled with data points which can be represented by an image which is the reflection (or 'mirror') of the image which would represent a first edge list created without any re-ordering.

FIG. 6 shows a frame of raw seismic data obtained from a cable of sensors, and various other images representing various stages during the error detection process. As mentioned earlier these images are purely illustrative and do not need to be reproduced during typical operation of the apparatus of the preferred embodiment.

Image 610 shows a frame of raw data obtained from one cable of geophone sensors for one particular shot; this image will preferably have been corrected for noise using a known noise correction technique. Image 620 is illustrative of the image that can be produced to represent the edge list created by edge detector 250. The axis of symmetry as generated by the axis detector 240 is shown superimposed on image 620.

As discussed the divider takes the edge list represented by image 620 and creates right and left-side edge lists, the data in the left-side list having been reordered; these two edge lists are represented by images 630 and 640 respectively. Image 650 illustrates the proportion of data points matched by the matching device 160, whilst image 660 illustrates the proportion of unmatched data points.

The value of the above described preferred embodiment (corresponding to technique (b) in FIG. 2) is that it reduces computing overhead by performing a single edge-detection step, followed by an efficient splitting process. Its effectiveness has been demonstrated by processing a seismic shot which was contrived to be symmetrical and achieving 100% matching between the two sides.

While the invention has been particularly shown and described with reference to a preferred embodiment, it will be understood by those skilled in the art that various changes in form and detail may be made therein without departing from the spirit and scope of the invention.

What is claimed is:

1. Apparatus for detecting errors in frames of seismic data capable of being presented as images, such images being expected to exhibit an inherent symmetry about an axis, the apparatus comprising:

a storage device for storing a frame of seismic data capable of being presented as an image;

a selection device for selecting an axis within the image as the axis of symmetry;

a divider for dividing the data about the axis of symmetry to create first and second sets of data, wherein the divider includes a mirroring means for re-ordering the data in the first set of data so that it can be presented by an image which would be the mirror image of the image previously representing the set; and a comparison means for comparing the re-ordered first set of data and second set of data according to preselected matching criteria to determine, based on the degree of matching, whether the extent of mismatch in the frame of data is within a predetermined tolerance and, if it is, to indicate the frame of seismic data is valid.

2. Apparatus as claimed in claim 1, wherein the comparison means comprises:

a matching device for comparing the first and second sets of data to determine the degree of matching between such sets; and decision logic, responsive to output from the matching device, to determine whether the extent of mismatch is within the predetermined tolerance.

3. Apparatus as claimed in claim 2, wherein the comparison means further comprises:

an edge detector for determining the data points representing discontinuities in the image, and to create an edge list of such data points, such edge lists being used as the basis of comparison by the matching device.

4. Apparatus as claimed in claim 3, wherein the divider operates on the whole frame of seismic data prior to passing the first and second sets of data separately through the edge detector, the edge lists created by the edge detector being received by the matching device for comparison.

5. Apparatus as claimed in claim 3, wherein the edge detector operates on the whole frame of seismic data and then the edge list is operated on by the divider so as to create two edge lists as the first and second sets of data for comparison by the matching device.

6. Apparatus as claimed in claim 3, wherein the edge detector employs a canny edge detection algorithm in order to identify the data points representing edges.

7. Apparatus as claimed in claim 1, wherein the mirroring means re-orders the first set of data created by the divider by employing a buffer in which to store data from that set of data constituting a row of an image, the contents in the buffer then being read out in reverse order and stored as the re-ordered first set of data.

8. Apparatus as claimed in claim 2, wherein the matching device uses a stereo matching algorithm.

9. Apparatus as claimed in claim 8, wherein the stereo matching algorithm is the PMF algorithm.

10. Apparatus as claimed in claim 1, wherein the selection device is an amplitude peak detector which selects the axis of symmetry as the position in the data having the highest detected intensity.

11. Apparatus as claimed in claim 1, wherein the selection device uses information contained in the seismic data, giving the positioning of the shot for that frame of data, to select an axis as the axis of symmetry.

12. A method of detecting errors in frames of seismic data capable of being presented as images, such images being expected to exhibit an inherent symmetry about an axis, the method comprising the steps of:

(a) storing a frame of seismic data capable of being presented as an image in a storage device;

(b) selecting an axis within the image as the axis of symmetry;

(c) employing a divider to divide the image about the axis of symmetry to create first and second sets of data, wherein the dividing step includes a mirroring step which re-orders the data in the first set of data so that it can be represented by an image which would be the mirror image of the image previously representing that set;

(d) comparing, in a comparing means, the re-ordered first set of data and second set of data according to preselected matching criteria to determine, based on the degree of matching, whether the extent of mismatch in the frame of data is within a predetermined tolerance; and (e) indicating, if extent of the mismatch is within the predetermined tolerance, that the frame of seismic data is valid.

13. A method as claimed in claim 12, wherein the comparison step comprises the steps of:

(i) forming an edge list for each of the first and second sets of data;

(ii) comparing, in a matching device, edge lists to determine the degree of matching between the edges represented by such lists; and (iii) determining, in response to output from the matching device, whether the extent of mismatch is within the predetermined tolerance.

14. A method as claimed in claim 13, wherein the comparison step further comprises, prior to the comparing step, the step of:

(iii) determining, in an edge detector, the data points representing discontinuities in the image, and creating an edge list of such data points, such edge lists being used as the basis of comparison by the matching device.

15. A method as claimed in claim 14, wherein the edge detection step is performed on the whole frame of data and then the edge list is used as the input for the step of dividing the image so as to create two edge lists as the first and second sets of data for comparison.

16. A method as claimed in claim 12, wherein the dividing step is performed prior to the step of comparing.

* * * * *

UNITED STATES PATENT AND TRADEMARK OFFICE
CERTIFICATE OF CORRECTION

PATENT NO. : 5,535,286
DATED : July 9, 1996
INVENTOR(S) : *Ibbotson et al.*

It is certified that error appears in the above-indentified patent and that said Letters Patent is hereby corrected as shown below:

On the title page, item [73], add the following:
  --Western Atlas International, Inc., Houston, Texas--

Signed and Sealed this

Seventh Day of July, 1998

Attest:

BRUCE LEHMAN

*Attesting Officer*          *Commissioner of Patents and Trademarks*